Feb. 4, 1964   G. W. ROHRIG   3,120,209
TORPEDO POWER CIRCUIT
Filed Nov. 23, 1960
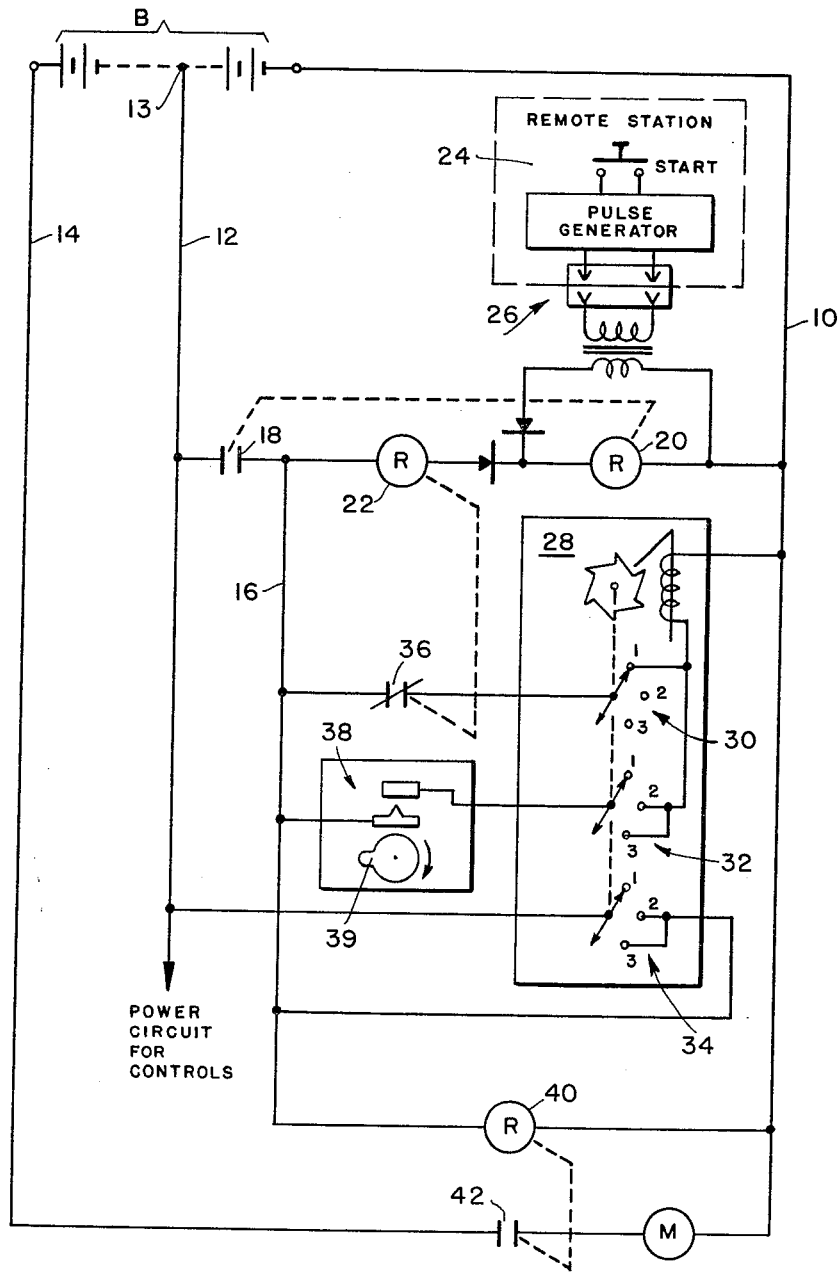
INVENTOR.
GEORGE W. ROHRIG
BY
*V.C. Muller*
ATTORNEY

United States Patent Office 3,120,209
Patented Feb. 4, 1964

3,120,209
TORPEDO POWER CIRCUIT
George W. Rohrig, Sharon, Pa., assignor, by mesne assignments, to the United States of America as represented by the Secretary of the Navy
Filed Nov. 23, 1960, Ser. No. 71,363
2 Claims. (Cl. 114—20)

This invention relates to electric torpedoes and more particularly to improvements in torpedo power circuitry and control circuitry connecting the propulsion motor to the power circuit.

Torpedoes propelled by electric motors commonly have separate power supply lines for the propulsion motor and for the control apparatus, that is, the homing equipment, steering control equipment and the like. When such separate supply lines are employed, it is desirable to operate the contactor for connecting the propulsion motor to the battery from the control power supply, so that any failure of control power will shut down the main propulsion motor. This provides a safety feature to obviate a likelihood of an armed torpedo running without control. In some instances the propulsion power battery is tapped to provide the control power, and when this is done the in-rush current initially drawn by the propulsion motor momentarily lowers the voltage across the control power line. In these instances, the aforesaid safety arrangement of operating the contactor from the control power line has been found unsatisfactory because the momentary drop has at times de-energized the main contactors, causing the torpedo run to fail.

An object of the present invention is to provide an improved control circuit for connecting the propulsion motor to the power supply, which is not subject to malfunction by momentary battery voltage drops upon start of the propulsion motor.

Another object is to provide a circuit as aforesaid having a high degree of reliability and employing inexpensive components.

Other objects and many of the attendant advantages of this invention will be readily appreciated as the same becomes better understood by reference to the following detailed description when considered in connection with the accompanying drawings wherein:

The single figure is a schematic of a torpedo power circuit and the control circuit for connecting the propulsion motor to the power circuit, as an exemplary embodiment of the present invention.

Referring now to the drawing, the power supply circuitry for a torpedo comprises a negative return conductor 10 connected to the negative terminal of a battery B, a low voltage positively energized power line 12 connected to an intermediate battery tap 13, and a high voltage positively energized power line 14 connected to the positive terminal. Low voltage power line 12 may be connected to a conductor 16 through normally opened contacts 18 of a voltage sensitive relay 20 which closes contact 18 only if the voltage thereacross is in excess of a predetermined value, and if the voltage drops below this value sometimes called "drop out voltage," the contacts open. The value of the drop out voltage is determined by the minimum voltage required to operate the control apparatus, not shown, in the torpedo. The energizing circuit for relay 20 extends from conductor 16 through a time delay relay 22, through relay 20, to negatively energized line 10. Suitable means are provided to remotely initially energize relay 20 at the time the torpedo is launched, as for example, a remote actuating station 24 in the launching ship adapted to transmit a suitable energizing pulse to the relay through an umbilical cable connection 26 which becomes disconnected as the torpedo starts on its run. If desired, the pulse from remote station 24 may be of alternating current, which is commonly available in ship's fire control equipment, and in such instances it is suitably stepped down, rectified and isolated, as shown.

There is provided a rotary stepping switch 28 having a solenoid operated ratchet and pawl mechanism which causes the switch to move one step from one to another of a first, second and third switch position, and thereafter back to the first position, upon each separate energization of the solenoid. Switch 28 has ganged wipers, with each wiper engageable with first, second and third contacts in the respective switch positions. A circuit for by-passing contacts 18 and connecting low voltage power line 12 to conductor 16 extends from line 12, through the second and third contacts of wiper and contact set 34, to conductor 16. One circuit for energizing the operating solenoid of switch 28 extends from conductor 16, through a normally closed contact 36 of time delay relay 22, the number one contact of wiper and contact set 32, the switch operating solenoid, to the negative return conductor 10. Another circuit for energizing the operating solenoid of switch 28 extends from conductor 16, through a suitable timing device having contacts which periodically close at predetermined intervals, such as contacts 38, which are operated by a constant speed motor driven cam 39, through number two and three contacts of wiper and contact set 32 and through the switch operating solenoid, to negative return line 10.

A main contactor 40 has an energizing circuit extending from conductor 16, through the contactor, to negative return conductor 10, and has normally open contacts 42 in a circuit for energizing propulsion motor M which extends from high voltage line 14, through contacts 42, motor M, to negative return conductor 10.

The circuitry operates as follows. The actuating button in remote station 24 is pressed to transmit an energizing pulse to voltage relay 20 closing contacts 18. Closure of contacts 18 positively energizes conductor 16 from the low voltage supply line and this completes the energizing circuit for relay 20 and maintains it in energized condition through its own contacts as long as the voltage of the power circuit does not drop below the "drop out voltage." Energization of conductor 12 also completes the circuit for energizing the operating solenoid of switch 28 through wiper and contact set 30, causing the switch to step from its first to second position, and completes the energizing circuit for contactor 42 causing its contacts to close and connect propulsion motor M to its power circuit. Stepping of switch 28 to its second position enables the second switch operating circuit, through wiper and contact set 32, to be operated by contacts 38, and also completes the circuit for by-passing contacts 18 through wiper and contact set 34. Contacts 38 close after an interval of time depending upon the starting position of the motor driven cam, causing switch 28 to step to its third position, and close again at the predetermined period it takes for the cam to make a complete rotation stepping the switch back to its number one position. Time delay relay 22 which is set to give only sufficient delay to permit initial stepping of the switch to the second position has opened by the time the switch returns to its first position, preventing further cycling of the stepping switch. It will be apparent that the circuit through wiper and contact set 34 by-passes contacts 18, for the period the stepping switch is in its second and third positions and that this period begins substantially simultaneously with the energization of contactor 40, since the circuit for stepping switch 28 to its second position and the circuit for energizing the contactor are in parallel. The minimum length of this period is equal to the interval between successive closings of contacts 38 and the maximum length is equal to twice such interval. The minimum period is chosen to be longer than the period over which propulsion motor M draws its high inrush current. Should starting of the motor cause the voltage at low voltage line 12 to temporarily drop below the "drop out voltage," conductor 16 and in turn contactor 40 will remain energized through the by-pass circuit through wiper and contact set 34. Upon recovery of the voltage, within the interval that switch 28 is in its second or third position, relay 20 will be re-energized and normal operation of the circuit resumed.

Obviously many modifications and variations of the present invention are possible in the light of the above teachings. It is therefore to be understood that within the scope of the appended claims the invention may be practiced otherwise than as specifically described.

What is claimed is:

1. In a torpedo having a battery source of power, a propulsion motor adapted to be energized thereby, a first relay for connecting said motor to said battery, a second relay having normally open contact means to operate said first relay and to establish a circuit to connect said battery to said second relay to energize the latter, said second relay being subject to de-energization and thereby permitting said first relay to open and thereby disconnect the propulsion motor and the source of power upon momentary voltage drop of said battery accompanying the starting of the propulsion motor, and a firing station remote from the torpedo operatively connected to said second relay and adapted to initially close its contact means to start the propulsion motor, the improvements, in combination, comprising; circuit means carried by the torpedo responsive to closing of said contact means and operable simultaneously with connection of said motor to said battery including a timer for by-passing said contact means during the period of battery voltage drop to prevent said first relay from opening.

2. Apparatus in accordance with claim 1, said circuit means comprising a stepping switch having a first, second and third position, and adapted to by-pass said contact means in its second and third position, circuit means responsive to closing of said contact means for causing said stepping switch to change from its first to second position, circuit means responsive to said timer for causing said switch to move from its second position to a third position and from its third position to the first position in a predetermined period of time.

References Cited in the file of this patent

UNITED STATES PATENTS 2,706,957     Hughes _____ Apr. 26, 1955